Apr. 17, 1923.
R. W. PITTMAN
1,451,842
MAGAZINE FOR FILM MACHINES
Filed March 8, 1921
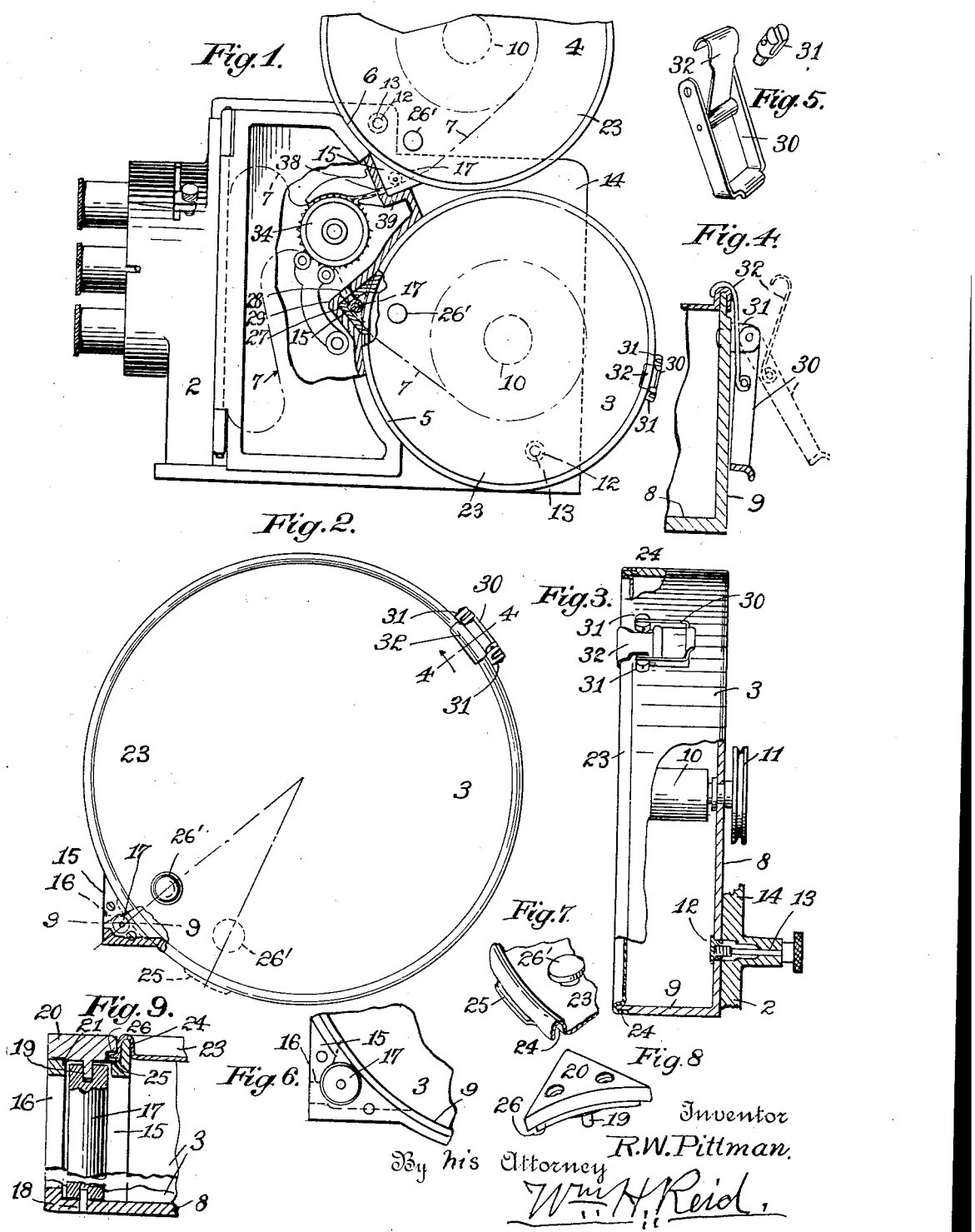
Inventor
R. W. Pittman,
By his Attorney
Wm H. Reid, Patented Apr. 17, 1923.

1,451,842

UNITED STATES PATENT OFFICE.

REINHART W. PITTMAN, OF NEW YORK, N. Y.

MAGAZINE FOR FILM MACHINES.

Application filed March 8, 1921. Serial No. 450,703.

*To all whom it may concern:*

Be it known that I, REINHART W. PITTMAN, a citizen of the United States of America, and resident of New York city, in the county of New York and State of New York, have invented certain new and useful Improvements in Magazines for Film Machines, of which the following is a full, clear, and exact description.

This invention relates to a container especially adapted for holding a roll of film such as used in moving picture machines, projecting machines or cameras, in which the film is supplied in one of the magazines, and after passing through the apparatus is received in another magazine of the same character, which magazines are duplicates and interchangeable.

One object of the present invention is to provide an improved form of magazine of this character, and further to provide an improved arrangement of the apparatus to receive and cooperate with this form of magazine, and in which arrangement the film passes from the magazine, or into the same, through a suitable opening in an extension of the magazine.

A further object of the invention is to provide an improved disposition of the magazines whereby one of them is located at the rear of the apparatus and the other one above the said magazine.

Another object of the invention is to provide an improved form of cover for the magazine and means for securing the cover thereon.

In the accompanying drawing showing one embodiment of my invention, Fig. 1, shows a camera of this character with two magazines, being partly in section.

Fig. 2 is a side elevation of one magazine.

Fig. 3 is an end elevation, partly in section.

Fig. 4 is a partial section enlarged at one end of the magazine showing the clamp.

Fig. 5 shows the clamp detached.

Fig. 6 is a partial view enlarged of the magazine at the outlet.

Fig. 7 shows one edge of the cover.

Fig. 8 shows the block for the cover extension.

Fig. 9 is a section through the extension on the line 9—9 of Fig. 2.

The magazines are shown attached on a moving picture machine, preferably a camera, denoted generally by 2. The magazines 3 and 4 are arranged at the rear of the camera, whose rear portion at one side is provided with a concave wall 5 curved to receive the magazine 3. The magazine 4 is located above the magazine 3, and engages the curved rear wall 6 of the camera, as shown. These walls are provided with suitable apertures that register with apertures in the magazines, for the entrance and exit of the film 7.

These magazines 3 and 4 are substantially identical, and comprises a cylindrical drum formed of a base 8 and a rim portion 9. A suitable movable spool 10 is provided to rotate in the magazine with a driver pulley 11, that is suitably driven to wind the film on the spool in the usual manner. The base 8 is provided with a threaded socket portion 12, adapted to receive a clamp screw 13 carried by the side plate 14 of the camera, that will secure the magazine with the rim 9 engaging the curved wall 5, or 6.

Each magazine is provided with an extension 15 of angular shape, formed by an extension of the rim 9, one of whose walls contains a slot 16 for the passage of the film. This extension may also be provided with a roller 17 to guide the film from the spool in the magazine, out through the slot 16. At one end this roller engages a pin 18 in the extension of the base 8, while at the other end the roller engages a pin 19 on a block 20, that is attached on one end of the extension 15, which end member 21 contains an opening to receive the roller 19.

The cover 23 for the magazine is adapted to engage the edge of the rim portion 9 to exclude light rays. As shown the cover is given a bend to provide an annular channel 24 that receives the margin of the rim 9 preferably reduced to enter this channel. Suitable fastening means are provided for the cover, and a lug 25 is provided at one edge, see Fig. 7, that engages a shoulder portion 26 of the block 20, see Fig. 9. To cause the lug to enter this shoulder, that extends along one face of the block as shown in Fig. 8, the cover is applied with the lug beyond the block, see Fig. 2, and then the cover is rotated on the rim until it extends into the shouldered portion of the block as indicated in full and broken line, in Fig. 2. A button 26' on the cover serves as a convenient means to rotate the cover to bring its extension 25 under the shoulder 26.

A second fastening means is also provided and arranged at the opposite side of the cover. This is shown as a clamp member comprising a lever in the form of a bail 30, pivoted on bolts, 31, 31, on the outer face of the rim 9. This bail carries a hook link 32 hinged thereto and adapted to engage the channel portion of the cover, see Fig. 3. The bail lever is swung outwardly and the hook caused to engage the cover, and then the bail swung down against the rim 9 that will cause the bail to move against a dead center, and press against the wall 8 to hold the bail and link in the locking position. Obviously the bail is easily released simply by swinging it outward, as indicated in Fig. 4.

The casing wall 29 is given a recessed portion 27, shaped to receive the extension 15 of the magazine with a slot 28 therein arranged to register with the slot 16 of the magazine extension. The curved wall arranged to receive the magazine 4 has a similar recessed portion 27, to receive the extension on the magazine, being provided with a slot 38 to register with the slot in the magazine extension.

The camera as shown is provided with a sprocket wheel 34 arranged to receive the film 7 from one magazine, and also to direct the film to the other magazine, being in proximity to each of the slots 28 and 38. This sprocket will draw the film out of the supply magazine in the usual manner, when it is received by suitable feeding apparatus. After exposure, the film again passes against this sprocket 34 and passes into the other magazine, where it is wound on the spool 10 by the driver or pulley 11, forming a take-up for the film.

It will be understood that a device of this character is extremely simple in use and operation, the magazines being merely placed in position and secured by the bolt 13 which will bring their outlet slot adjacent the slotted recess in the camera wall, and form a light-tight connection. Each magazine has a lid that is easily removable and yet prevents admission of light rays.

What I claim is:—

1. In a film camera, a casing, a cylindrical magazine, a cover arranged to engage the magazine, a lug on the cover, said magazine having a shouldered portion arranged to receive said lug on the cover when turned, and a lever clamp on the opposite side of the magazine to secure the cover on the magazine.

2. A casing a cylindrical film magazine having a slotted extension on its periphery, a cover with an annular channel arranged to engage the magazine rim to rotate thereon, a lug on the cover, said magazine having a shouldered portion arranged to receive said lug on the cover when turned, and a fastener on the opposite side of the magazine to engage the cover.

3. A cylindrical film magazine having a slotted extension on its periphery, a cover with an annular channel arranged to engage the magazine rim to rotate thereon, a lug on the cover, said magazine having a shouldered portion arranged to receive said lug on the cover when turned, and a lever clamp on the opposite side of the magazine arranged to engage the cover channel portion to clamp the cover thereon.

Signed at New York city, March 7th, 1921.

REINHART W. PITTMAN.